(12) United States Patent
Templeton

(10) Patent No.: US 6,240,642 B1
(45) Date of Patent: Jun. 5, 2001

(54) COMPACT PRUNING SAW

(76) Inventor: Roger D. Templeton, 337 Gumtree La., Brewton, AL (US) 36426

( * ) Notice: Subject to any disclaimer, the term of this patent is extended or adjusted under 35 U.S.C. 154(b) by 0 days.

(21) Appl. No.: 09/368,558

(22) Filed: Aug. 5, 1999

(51) Int. Cl.$^7$ .................................................. B26B 11/00
(52) U.S. Cl. ............................ 30/125; 30/162; 30/296.1; 30/517
(58) Field of Search ............................ 30/125, 298, 517, 30/162, 296.1

(56) References Cited

U.S. PATENT DOCUMENTS

| | | | | |
|---|---|---|---|---|
| Re. 34,358 | * | 8/1993 | Miller | 30/296.1 |
| 527,240 | * | 10/1894 | Garies . | |
| 1,611,886 | * | 12/1926 | Champlin . | |
| 3,861,494 | * | 1/1975 | Grego | 30/168 |
| 4,654,971 | * | 4/1987 | Fettes et al. | 30/383 |
| 4,669,186 | * | 6/1987 | Liu | 30/125 |
| 4,823,468 | * | 4/1989 | Kollogger | 30/368 |
| 5,228,202 | * | 7/1993 | Liao | 30/249 |
| 5,569,282 | * | 10/1996 | Werner | 30/162 |
| 5,842,301 | * | 12/1998 | Cassem | 43/25 |
| 5,911,481 | * | 6/1999 | Yost | 30/125 |

* cited by examiner

Primary Examiner—Rinaldi I. Rada
Assistant Examiner—Melissa L. Hall
(74) Attorney, Agent, or Firm—John V. Stewart

(57) ABSTRACT

A telescoping series of coaxial nested tubes 1–4 extend to provide an elongated handle. Each inner tube of the series has a back end with a gradual conical flare. Each tube that encloses a smaller tube has a front end with a gradual conical reduction. At full extension the tubes stop and bind against each other, so no clamps or screws are needed. A pruning saw blade 7 is attached to the front end of the innermost tube 4. The innermost tube is shorter than the outer tube 1 by at least the length of the saw blade, so that all the tubes and the blade retract within the outer tube. Caps 10 and 13 close the outer tube on each end. A resilient damper in each cap presses against the ends of the inner tubes, preventing motion and noise among them. A spare saw blade can be enclosed in the innermost tube 4. It can be retained in a hole in the back damper 11, or in a resilient slotted plug in the innermost tube. The front cap 13 preferably includes a direction-finding compass 15 for wilderness use. A threaded bolt 14 or other attachment means preferably extends backward from the back cap for mounting the collapsed saw in a convenient location.

13 Claims, 4 Drawing Sheets

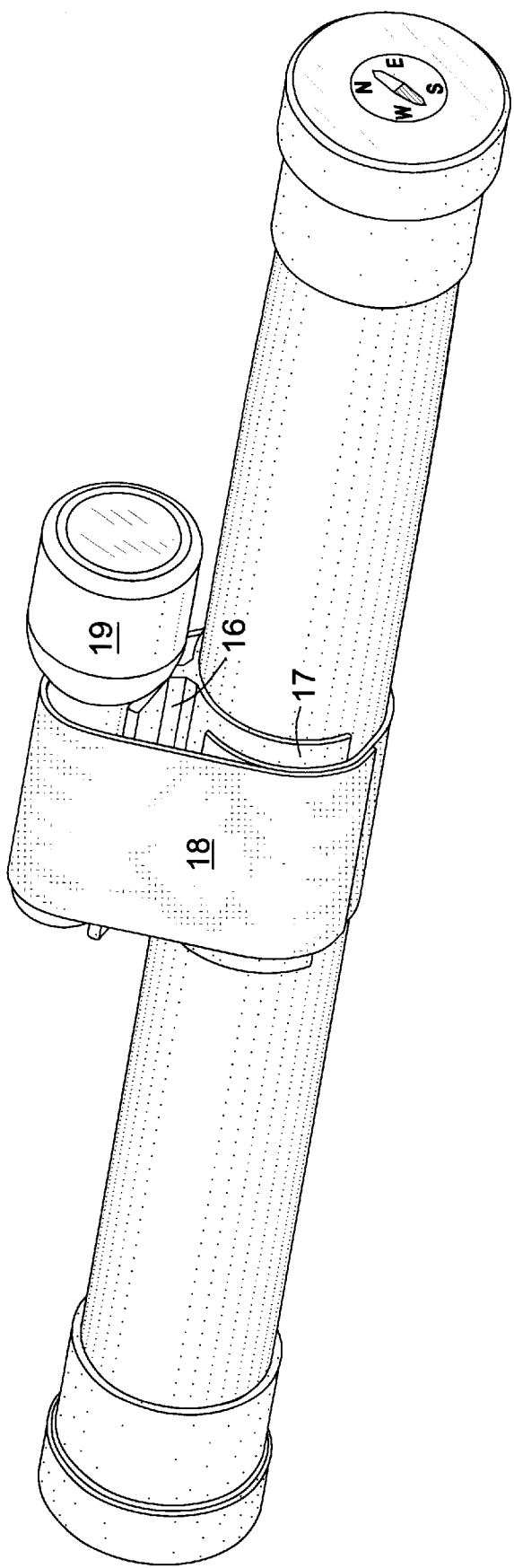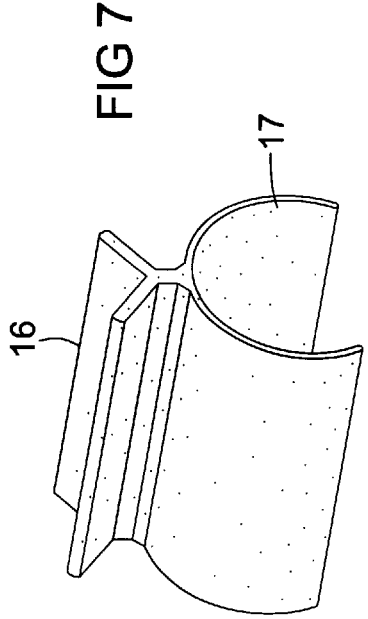

COMPACT PRUNING SAW

BACKGROUND OF THE INVENTION

1. Field of the Invention

This invention is in the field of pruning saws.

2. Description of Prior Art

Existing pruning saws with extendable handles are bulky, inconvenient to extend and retract, hazardous to carry and store, and can create noise while being carried or moved. These saws are not appropriate for use in the wilderness by hunters, and animal watchers. Existing pruning saws of all types use clamping devices or screws to secure the blade to the handle. These mechanisms are not convenient for changing blades in a hunter's blind or lookout platform in a tree.

SUMMARY OF THE INVENTION

The objectives of the present invention are provision of a very compact pruning saw that is safe and convenient to store and carry, can be quickly extended for use, and quickly retracted. It should have quick and easy means for attaching the blade to the handle without tools, and should hold a spare blade. It should be silent when carried, so that hunters and animal watchers who may need a small pruning saw to clear a lookout will avoid alerting the animals. It should be resistant enough to shock and damage in its retracted position to survive such activities as backpacking, camping, canoeing, and being dropped to the ground from trees.

The objectives of the present invention are achieved by a collapsible pruning saw with a telescoping series of coaxial nested tubes 1–4 that extend to provide an elongated handle. Each inner tube of the series has a back end with a gradual conical flare. Each tube that encloses a smaller tube has a front end with a gradual conical reduction. At full extension the tubes stop and bind against each other, so no clamps or screws are needed. A pruning saw blade 7 is attached to the front end of the innermost tube 4. The innermost tube is shorter than the outer tube 1 by at least the length of the saw blade, so that all the tubes and the blade retract within the outer tube. Caps 10 and 13 close the outer tube on each end. A resilient damper in each cap presses against the ends of the inner tubes, preventing motion and noise among them. A spare saw blade can be enclosed in the innermost tube 4. It can be retained in a hole in the back damper 11, or in a resilient slotted plug in the innermost tube. The front cap 13 preferably includes a direction-finding compass 15 for wilderness use. A threaded bolt 14 or other attachment means preferably extends backward from the back cap for mounting the collapsed saw in a convenient location.

BRIEF DESCRIPTION OF THE DRAWINGS

FIG. 6 is a perspective view of the retracted saw configuration showing an optional flashlight mounting bracket and compass.

FIG. 7 is a perspective view of a removable flashlight mounting bracket.

REFERENCE NUMBERS

Figure 5:
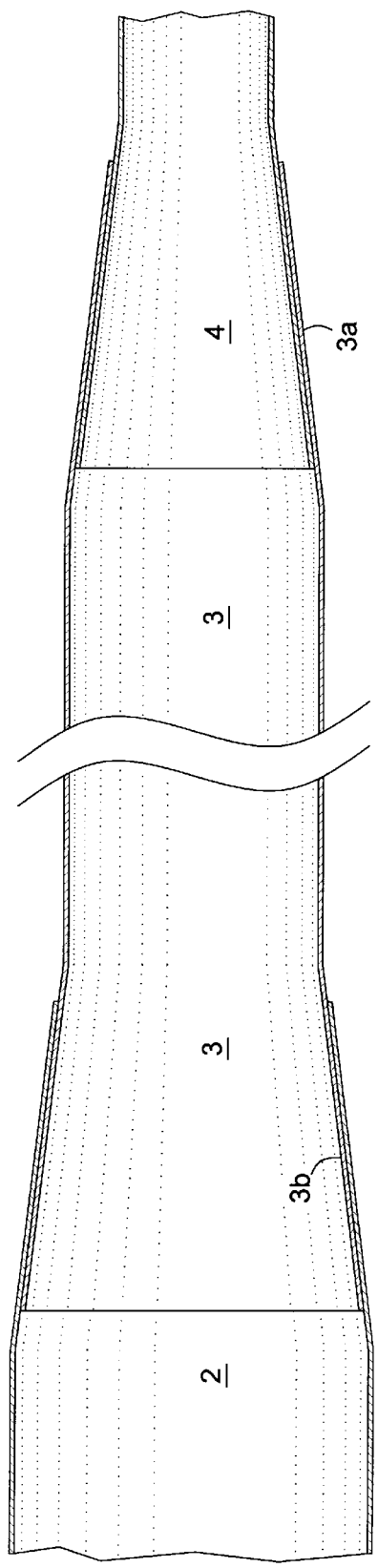
FIG. 5 is a partial side sectional view of telescoping tubular sections in the extended configuration, with conical ends exaggerated to clearly show the nature of the interlock.

1. First tube (outermost)
2. Second tube
3. Third tube
3a. Expanded back end of tube (exaggerated for clarity in FIG. 5)
3b. Reduced front end of tube (exaggerated for clarity in FIG. 5)
4. Fourth tube (innermost)
5. Blade holder fitting
6. Blade mounting threads on end of blade
6a. First half of threads for saw blade
6b. Second half of threads for saw blade
6c. Depression to fit back end of saw blade
7. Pruning saw blade
8. Spare saw blade
9. Back end cap fitting
10. Back end cap
11. Resilient damper
12. Front end cap fitting
13. Front end cap
14. Carriage bolt for mounting the collapsed saw on a storage bracket.
15. Optional compass
16. Optional flashlight holder bracket
17. Clip portion of flashlight holder
18. Velcro type strap
19. Flashlight
20. Resilient sheath for holding spare blade in innermost tube

DESCRIPTION OF THE PREFERRED EMBODIMENTS

Figure 1:
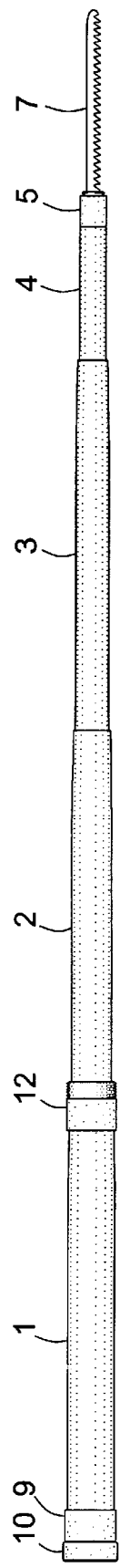
FIG. 1 is an external side view of the saw in its extended configuration.

FIG. 1 shows a pruning saw with a telescoping handle made of tubular segments 1–4 of decreasing diameters. Segment 1 has the largest diameter. Each successive segment 2–4 nests inside the previous segment. Each segment is shaped to extend to a stopping point and automatically interlock with the next larger segment. This is shown conceptually in FIG. 5 using exaggerated conical angles for clarity. The front end of each segment except the innermost is reduced in diameter, and the back end of each segment except the outermost is enlarged in diameter. The reduced front end of a given segment has a smaller inner diameter than the outer diameter of the enlarged back end of the next smaller segment. Thus the back end of each inner segment stops against the inner surface of the front end of the next larger segment, and binds the two segments together at full extension. This allows quick extension of the saw handle to its operating position without manipulation of segment clamps. The conic angle of the reduced and enlarged ends is gradual. It is chosen such the segments bind securely, but can be quickly collapsed with adequate inward force from the ends. The saw teeth are angled backward, and cut during the pull cycle of the sawing motion. Thus the segments do not collapse during sawing.

Figure 3:
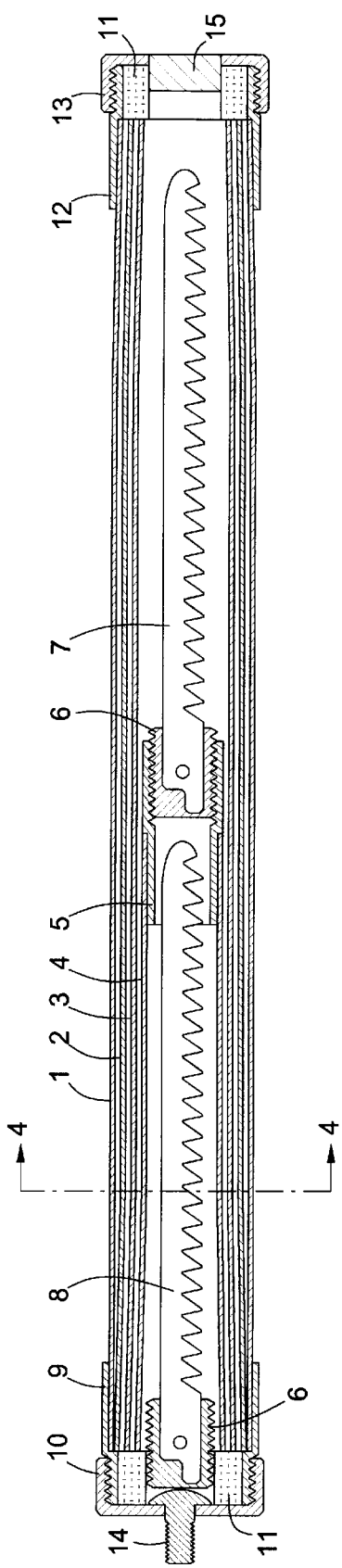
FIG. 3 is a sectional side view of the saw in its retracted configuration.
Figure 4:
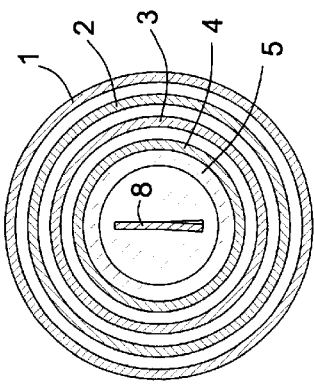
FIG. 4 is a cross sectional view taken along line 4—4 of FIG. 3.
Figure 9:
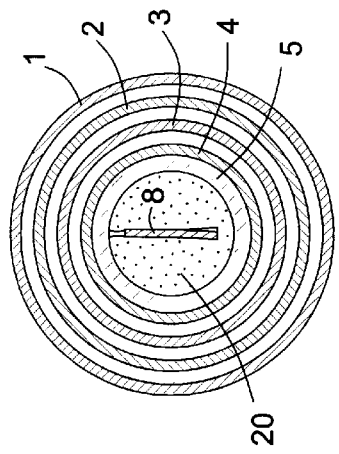
FIG. 9 is an exploded view of the threaded part of the saw blade embodied as two halves with a blade-fitting depression between them.

FIG. 3 shows the saw fully retracted into the outermost tube and capped for safe handling. The saw blade 7 is completely enclosed in the segments, and thus cannot cut the user or items during storage or transport. The innermost segment 4 has a threaded fitting 5 on its front end that receives external threads 6 on the back end of the saw blade. Preferably the external threads 6 are formed on the saw blade by plastic molding. They can alternately be formed in two halves 6a and 6b as shown in FIG. 9 with a depression 6c in one or both halves shaped to receive the back end of the saw blade. The two halves can be glued together with the blade enclosed between them in the depression(s). In either case, the threaded saw blade allows a user to mount or dismount a saw blade easily without tools.

An end cap 10 covers the back end of the outer segment 1. It is preferably mounted on a threaded fitting 9. This cap can be unscrewed and removed to retrieve the spare blade 8. It preferably holds a bolt 14 as shown, or other means for mounting the collapsed saw on a wall bracket. In the example of FIG. 3, bolt 14 is a carriage bolt inserted through a square hole in the end cap. A similar cap 13 covers the front end of the outer segment when the saw is collapsed. Resilient dampers 11 in each cap press against the ends of the inner segments, preventing motion and noise. Preferably, a direction-finding compass 15 is mounted in the front cap for convenient wilderness use.

Figure 2:
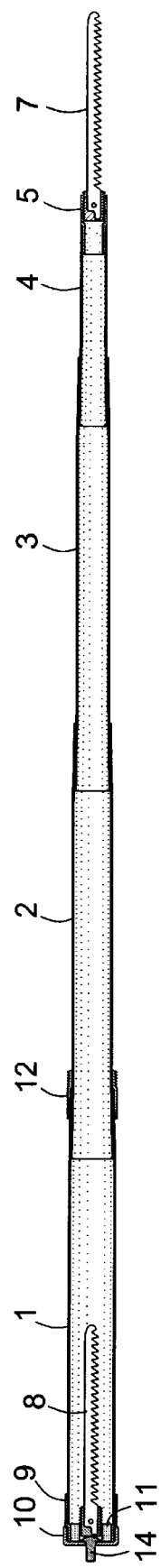
FIG. 2 is a sectional side view of the saw in its extended configuration.
Figure 8:
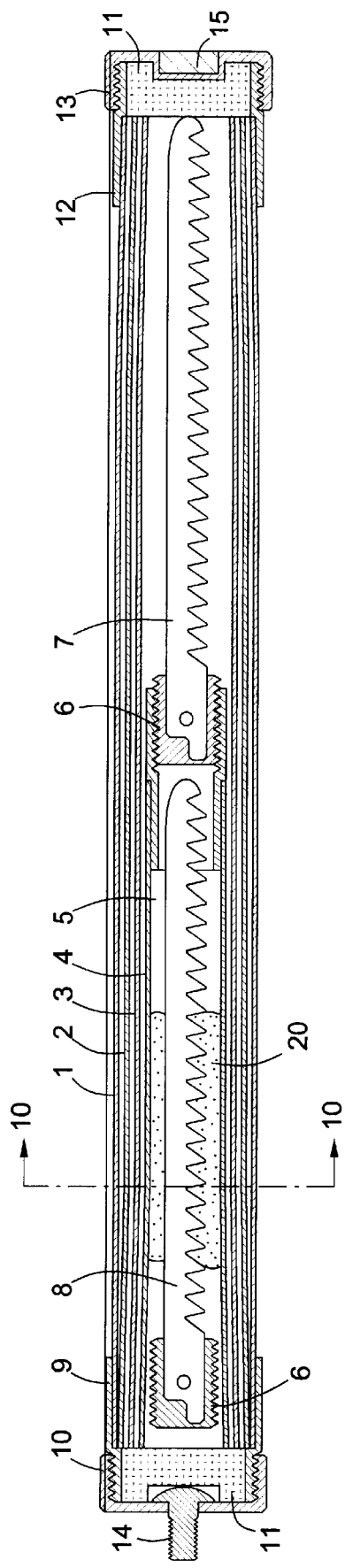
FIG. 8 is a sectional view of the retracted saw in an alternate form showing the spare blade retained by a resilient sheath in the innermost tube.
Figure 10:
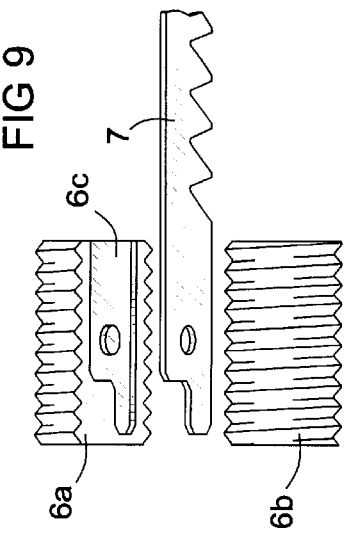
FIG. 10 is a cross sectional view taken along line 10—10 of FIG. 8

Preferably, a spare blade 8 is enclosed for use if needed. It can be inserted into a hole in the back damper 11 as shown in FIGS. 2 and 3. Alternately it can be held in the innermost tube 4 of the series by means of a resilient sheath 20 that is wrapped around the spare blade and pushed into the innermost tube 4 as shown in FIGS. 8 and 10.

The outer segment 1 is preferably cylindrical except for a reduced front end as previously described. Inner segments 2–3 are preferably cylindrical except for a reduced front end and enlarged back end as previously described. The innermost segment 4 is preferably cylindrical except for an enlarged back end as previously described. Optionally the tube segments can have a gradual conical surface along their entire length. The number of tube segments to be used is a choice of the product designer. Tubes with rectangular or other cross sections can be used instead of circular cross sections if desired.

Optionally, a bracket 16 can be provided for attaching a flashlight 19 on the outer tube for convenient use of the saw at night as shown in FIGS. 6 and 7. The bracket can be removably attached to the outer tube by a resilient clip 17 as shown, or it can be permanently attached. The flashlight handle is held away from, and parallel to, the outer tube by the bracket, so that the beam shines parallel to the axis of the saw handle. The flashlight can be secured with a Velcro type strap 18 as shown in FIG. 6, or by other means. The strap 18 can be glued to the flashlight mounting bracket 16 at any convenient point, such as on one side of a clip arm 17.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. A compact pruning saw comprising:
    a nested series of coaxial tubes having front and back ends, including an outer tube and one or more inner tubes fully retractable within the outer tube;
    each inner tube extendable forward to a stop against the next larger tube in the series;
    a pruning saw blade attached to, and extending forward from, the front end of the innermost nested tube of the series, the saw blade having front and back ends;
    the innermost nested tube of the series being shorter than the outer tube by at least the length of the saw blade;
    a cap on the back end of the outer tube; and
    a removable cap on the front end of the outer tube;
    whereby the inner tubes can be telescoped forward to a stopping point, providing a pruning saw with an elongated handle, and the inner tubes and saw blade can be retracted and completely enclosed within the outer tube, and held therein by capping the front end of the outer tube.

2. The compact pruning saw of claim 1, further comprising a direction-finding compass mounted in the cap on the front end of the outer tube.

3. The compact pruning saw of claim 1, further comprising a flashlight holding clip removably mounted on the outer tube.

4. The compact pruning saw of claim 1, further comprising a resilient damper mounted in at least one of the two caps for pressing against at least one end of the inner tubes when the inner tubes are fully retracted within the outer tube, to eliminate movement of the inner tubes.

5. The compact pruning saw of claim 1, further comprising a spare saw blade in the innermost tube of the series, and wherein the cap on the back end of the outer tube is removable for access to the spare blade.

6. The compact pruning saw of claim 1, wherein the innermost tube of the series has an internally threaded fitting on its front end, and the saw blade has matching external threads on its back end, for threaded mounting of the saw blade onto the front end of the innermost tube of the series.

7. A compact pruning saw, comprising:
    a nested series of telescoping tubes including an outer tube and at least one inner tube, each tube having front and back ends;
    for each adjacent pair of tubes in the nested series, the outermost tube has an inner diameter that gradually conically decreases toward the front end, and the innermost tube has an outer diameter that gradually conically increases toward the back end to exceed the inner diameter of the front end of the outermost tube of said pair;
    a pruning saw blade attached to, and extending forward from, the front end of the innermost nested tube of the series, the saw blade having front and back ends;
    the innermost nested tube of the series being shorter than the outer tube by at least the length of the saw blade;
    a cap on the back end of the outer tube; and
    a removable cap on the front end of the outer tube;
    whereby the inner tubes can be telescoped forward to a stopping point providing a pruning saw with an elongated handle, and the inner tubes and saw blade can be retracted and completely enclosed within the outer tube, and held therein by capping the front end of the outer tube.

8. The compact pruning saw of claim 7, further comprising a direction-finding compass mounted in the cap on the front end of the outer tube.

9. The compact pruning saw of claim 7, further comprising a flashlight holding clip removably mounted on the outer tube.

10. The compact pruning saw of claim 7, further comprising a resilient damper mounted in at least one of the two caps for pressing against at least one end of the inner tubes when the inner tubes are fully retracted within the outer tube, to eliminate movement of the inner tubes.

11. The compact pruning saw of claim 7, further comprising a spare saw blade in the innermost tube of the series, and wherein the cap on the back end of the outer tube is removable for access to the spare blade.

12. The compact pruning saw of claim 7, wherein the innermost tube of the series has an internally threaded fitting on its front end, and the saw blade has matching external threads on its back end, for threaded mounting of the saw blade onto the front end of the innermost tube of the series.

13. A compact pruning saw, comprising:
- a telescoping series of coaxial nested tubes that extend to provide an elongated handle;
- the telescoping series including an outer tube and at least one inner tube;
- each tube having front and back ends;
- the back end of each inner tube of the series having a gradual conical flare;
- the front end of each tube that encloses a smaller tube having a gradual conical reduction;
- at full extension, the flared back end of each inner tube stops and binds against the reduced front end of the next larger enclosing tube;
- a pruning saw blade attached to the front end of the innermost tube;
- the innermost tube being shorter than the outermost tube by at least the length of the saw blade;
- a back cap closing the back end of the outer tube;
- a removable front cap closing the front end of the outer tube; and
- a resilient damper in each cap pressing against the ends of the inner tubes, preventing motion and noise among them.

\* \* \* \* \*